UNITED STATES PATENT OFFICE.

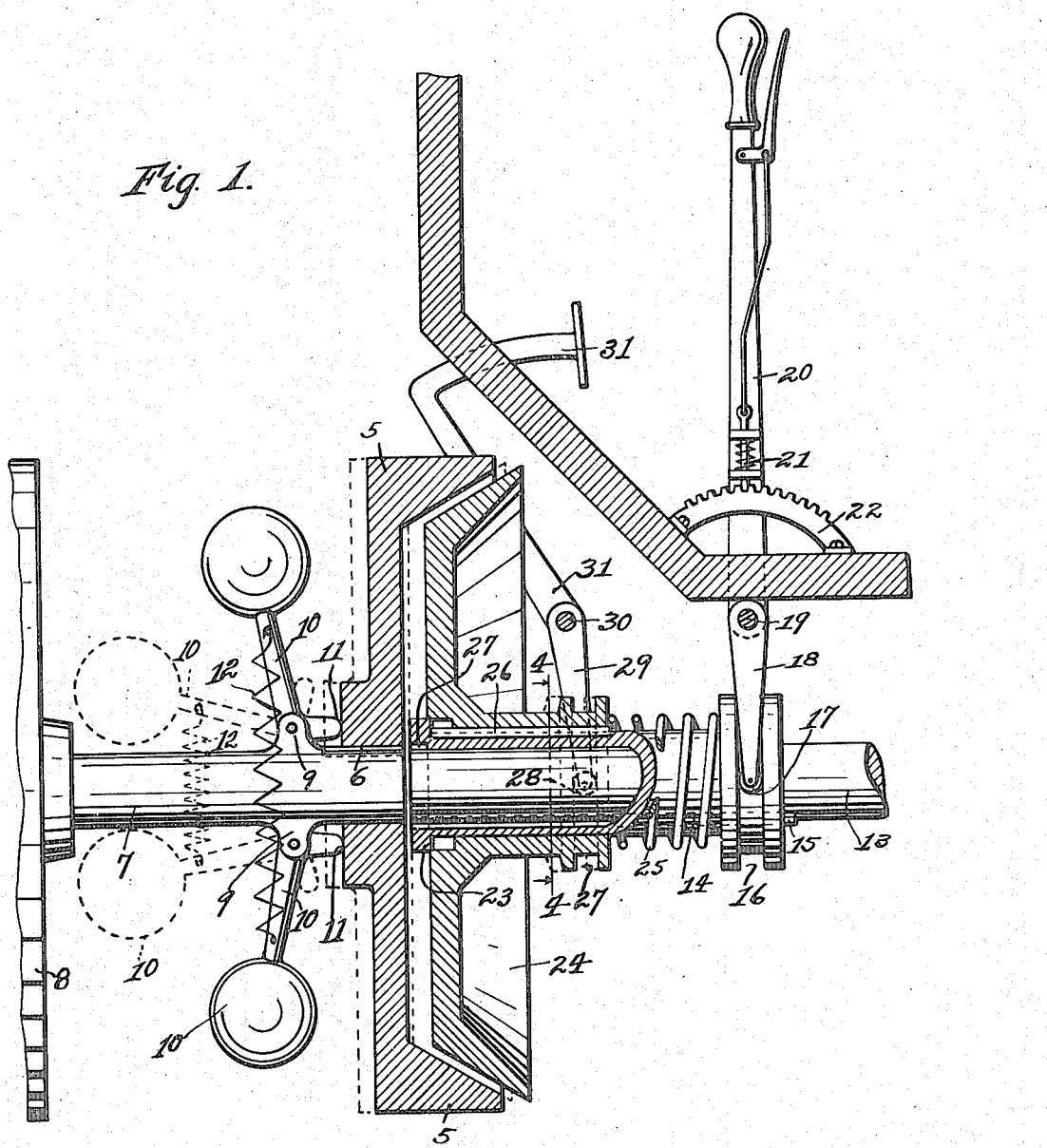

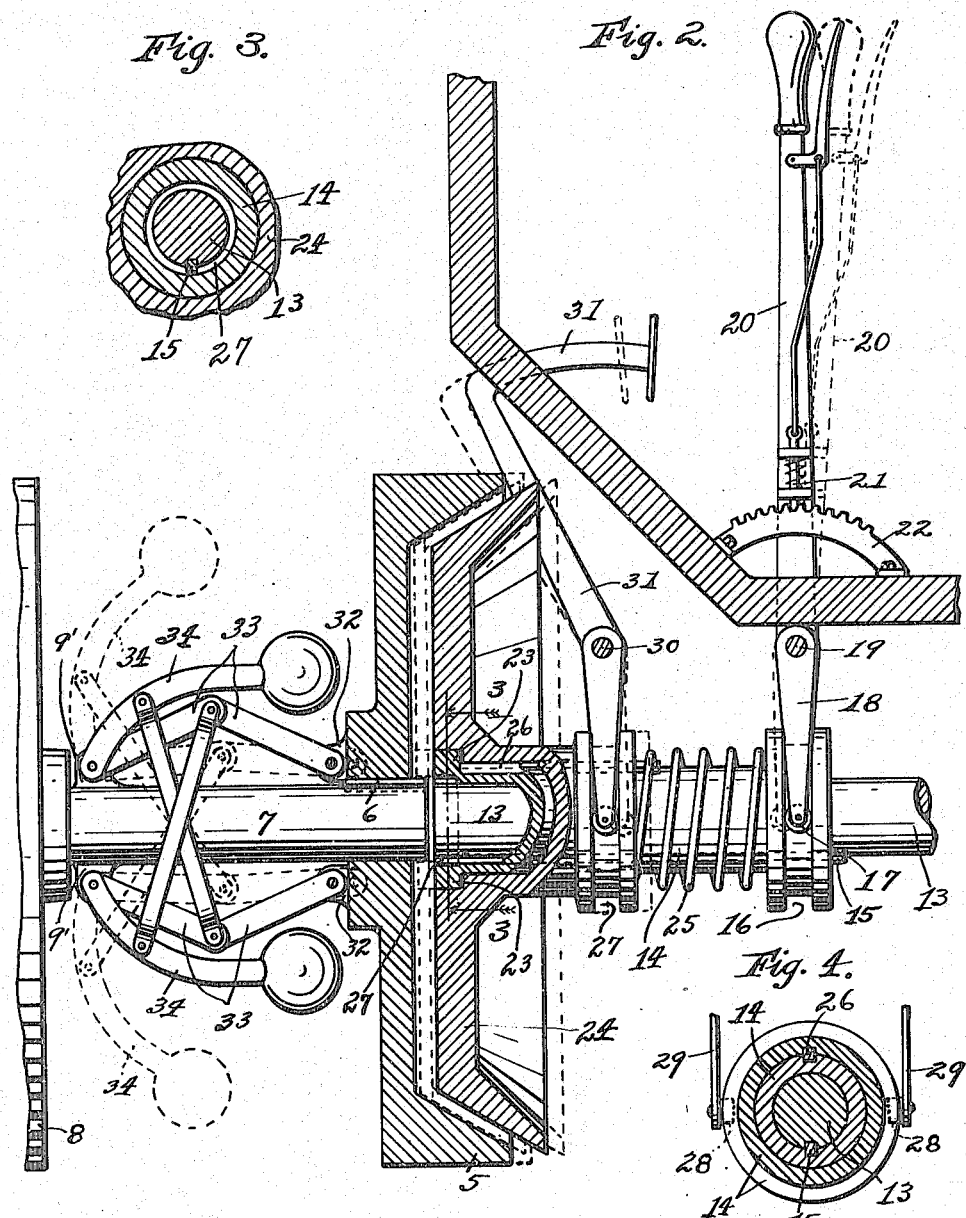

NATHAN LOUIS JENNINGS, OF CHICAGO HEIGHTS, ILLINOIS.

CLUTCH MECHANISM.

1,122,206.  Specification of Letters Patent.  Patented Dec. 22, 1914.

Application filed May 10, 1913. Serial No. 766,738.

*To all whom it may concern:*

Be it known that I, NATHAN LOUIS JENNINGS, a citizen of the United States, and a resident of the city of Chicago Heights, county of Cook, and State of Illinois, have invented certain new and useful Improvements in Clutch Mechanism, of which the following is a specification.

My invention relates to clutch mechanism and more particularly to such devices as are used in motor vehicles.

The object of this improvement is to provide a device of the character mentioned, embodying a clutch and automatic means for engaging and disengaging said clutch, also for reëngaging said clutch, when in disengaged condition, by manually operable means.

Other objects will appear hereinafter.

The invention consists in the combinations and arrangements of parts hereinafter described and claimed.

The invention will be best understood by reference to the accompanying drawings forming a part of this specification, and in which—

Figure 1 is a longitudinal section of a clutch mechanism, as applied to motor vehicles and embodying my invention, Fig. 2 is a similar view of the same showing a slightly different construction, Fig. 3 is a section taken on line 3—3 in Fig. 2, and Fig. 4 is a section taken on line 4—4 in Fig. 1.

The preferred form of construction as illustrated in the drawings comprises a driving clutch member 5, splined by means of a key 6, on a driving shaft 7 of a suitable motor, of which only a fragment of its flywheel 8 is shown. Shaft 7 is provided with ears 9 in which are pivotally mounted weighted bell crank levers 10 having curved surfaces 11 adapted to engage the clutch member 5 to move the latter longitudinally on shaft 7. The bell crank levers 10 are provided with a tension spring 12 to automatically bring them toward each other. With this construction it will be observed that the driving clutch member 5 and bell crank levers 10 will be rotated with shaft 7.

A driven shaft 13 is mounted for rotation in axial alinement with driving shaft 7 and a sleeve 14 splined thereon by means of a key 15 in a manner to be moved longitudinally thereof. The sleeve 14 is provided with an enlarged portion having a circular groove 16 therein which is adapted to be engaged by rollers 17 of the crank arms 18. The crank arms 18 are secured to shaft 19. Shaft 19 carries a lever 20 by which the sleeve 14 is manually operated through its connecting mechanism. The lever 20 is provided with a spring actuated lock 21 adapted to engage a sector gear 22 to lock the lever 20 and sleeve 14 in different positions. On one end of the sleeve 14 is a circular head 23 adapted to prevent the driven clutch member 24 from passing off the end of sleeve 14. The clutch member 24 is maintained against the head 23 by means of a compression spring 25. The clutch member 24 is splined on the sleeve 14 by means of a key 26 to rotate therewith. The clutch member 24 is provided with a circular groove 27 on its hub portion and said groove is engaged by rollers 28 of crank arms 29 to effect longitudinal movement of said clutch member on said sleeve. The crank arms 29 are secured to a shaft 30 which also carries a pedal crank arm 31 by which the clutch member 24 is operated through their connecting mechanism.

In Fig. 2 a slightly different form of centrifugally operated mechanism is shown to cause movement of the member 5. In this construction ears 9' are carried by shaft 7 and the clutch member 5 splined on shaft 7 as already described. The clutch member 5 carries ears 32 and the ears 9' and 32 are connected by means of the toggle joints 33. The ears 9' also carry weighted arms 34 which are pivotally connected thereto. The middle joints of the toggle joints 33 are connected with the weighted arms 34 substantially as indicated and in a manner to cause the toggle joint to move from the full line to the dotted line position upon movement of the weighted arms 34 from their full line to their dotted line positions in Fig. 2. In this construction the movement of weighted arms 34 from their full line to their dotted line positions move the clutch member 5 from its inoperative to its operative position, which positions are indicated by its full line and dotted line positions, respectively, in this figure.

From the construction set forth then, it will be observed that members 17 to 22 inclusive lock sleeve 14 at different positions on shaft 13, so that by adjusting said sleeve on said shaft the clutch members may be engaged at different rates of speed of the motor. Sleeve 14 is indicated in its normal position in Figs. 1 and 2 in full lines and at a position extending over shaft 7 in dotted lines in Fig. 2. To permit of this movement the end of sleeve 14 is provided with an annular recess 27' to allow said sleeve to pass over key 6 in shaft 7. The last mentioned position of sleeve 14 permits the clutch member 5 to engage clutch member 24 at a lower rate of speed than in its position shown in full lines, the utility of which will be pointed out later.

The clutch members 5 and 24 are shown in their normal positions of rest in full lines in Fig. 2. Clutch member 5 is shown in its normal operative position in full lines in Fig. 1, at which position it normally engages clutch member 24 to drive the latter. In Fig. 1, however, the full line position of clutch member 24 indicates its position taken when disengaged from clutch member 5 by means of foot pedal 21.

In operation, lever 20 is set permitting sleeve 14 to hold clutch member 24 in its full line position in Fig. 2 and the motor started. As soon as the motor attains a certain speed the centrifugally operable means automatically moves clutch member 5 to engagement with clutch member 24 and maintains it there until the speed is reduced as already explained. Should the speed be reduced from any cause sufficiently to cause the disengagement of the clutch members when such disengagement is not desired, as for instance when a large amount of power is used such, as in climbing hills, lever 20 may be shifted to move sleeve 14 over the end of shaft 7 permitting clutch member 24 to follow clutch member 5 and again cause engagement of the clutch members at a reduced rate of speed as will be readily understood.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. A clutch mechanism comprising a driving shaft; a driving clutch member slidably mounted on said driving shaft; a driven shaft; a sleeve mounted on said driven shaft and adapted to slide longitudinally thereon; a driven clutch member mounted on said sleeve and adapted to move longitudinally thereon; and means adapted to independently move said sleeve and said driven clutch member, substantially as described.

2. A clutch mechanism comprising a driving shaft; a driving clutch member slidably mounted on said driving shaft; a driven shaft; a sleeve mounted on said driven shaft and adapted to slide longitudinally thereon; a driven clutch member mounted on said sleeve and adapted to move longitudinally thereon; a member resiliently maintaining said driven clutch at one end of said sleeve; and means adapted to lock said sleeve in different positions on said driven shaft, substantially as described.

3. A clutch mechanism comprising a driving shaft; a clutch member slidably mounted on said shaft; a driven shaft; a sleeve splined on said driven shaft and having an annular head at one end thereof; a clutch member splined on said sleeve and adapted to coöperate with said first mentioned clutch member; a spring on said sleeve resiliently maintaining said second mentioned clutch member against said annular head; and hand operable means adapted to move said sleeve on said driven shaft to permit the coöperation of said clutch members, substantially as described.

4. A clutch mechanism comprising a driving shaft; a clutch member slidably mounted on said shaft; a driven shaft; a sleeve splined on said driven shaft and having an annular head at one end thereof; a clutch member splined on said sleeve and adapted to coöperate with said first mentioned clutch member; a spring on said sleeve resiliently maintaining said second mentioned clutch member against said annular head; and two manually operable levers, one connected with said sleeve and the other connected with said driven clutch and constituting means for engaging and disengaging said clutch members when the clutch member on said driving shaft is in different positions on the latter, substantially as described.

In testimony whereof I have signed my name to this specification in the presence of two subscribing witnesses.

NATHAN LOUIS JENNINGS.

Witnesses:
JOSHUA R. H. POTTS,
HELEN F. LILLIS.